(12) United States Patent
Jensen (10) Patent No.: US 9,356,822 B2
(45) Date of Patent: May 31, 2016

(54) AUTOMATED INTERFACE APPARATUS AND METHOD FOR USE IN SEMICONDUCTOR WAFER HANDLING SYSTEMS

(71) Applicant: Earl Jensen, Santa Clara, CA (US)

(72) Inventor: Earl Jensen, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 476 days.

(21) Appl. No.: 13/664,349

(22) Filed: Oct. 30, 2012

(65) Prior Publication Data

US 2014/0122654 A1    May 1, 2014

(51) Int. Cl.
*H04L 29/00* (2006.01)
*H04L 29/08* (2006.01)
*G05B 19/418* (2006.01)

(52) U.S. Cl.
CPC .... *H04L 29/08702* (2013.01); *G05B 19/41865* (2013.01); *H04L 67/12* (2013.01); *H04L 67/34* (2013.01); *G05B 2219/45031* (2013.01); *Y10S 901/50* (2013.01)

(58) Field of Classification Search
None
See application file for complete search history.

(56) References Cited

U.S. PATENT DOCUMENTS

| | | | | |
|---|---|---|---|---|
| 6,038,486 A * | 3/2000 | Saitoh et al. | | 700/96 |
| 6,468,021 B1 * | 10/2002 | Bonora | | H01L 21/67706 198/468.6 |
| 6,691,068 B1 * | 2/2004 | Freed et al. | | 702/187 |
| 6,807,503 B2 * | 10/2004 | Ye et al. | | 702/117 |
| 7,135,852 B2 * | 11/2006 | Renken et al. | | 438/5 |
| 7,233,874 B2 * | 6/2007 | Ye et al. | | 702/117 |
| 7,629,184 B2 * | 12/2009 | Kulp | | 438/14 |
| 7,757,574 B2 * | 7/2010 | Renken et al. | | 73/866.1 |
| 7,778,793 B2 * | 8/2010 | Bonciolini et al. | | 702/141 |
| 7,819,033 B2 * | 10/2010 | Renken | | 73/866.1 |
| 8,483,866 B2 * | 7/2013 | Huang | | B66F 19/00 198/348 |
| 2002/0078770 A1 * | 6/2002 | Hunter | | 73/865.9 |
| 2002/0148307 A1 * | 10/2002 | Jonkers | | 73/865.9 |
| 2004/0074323 A1 * | 4/2004 | Renken | | 73/866.1 |
| 2004/0109746 A1 * | 6/2004 | Suzuki | | H01L 21/67727 414/373 |
| 2004/0154417 A1 * | 8/2004 | Renken et al. | | 73/866.1 |
| 2004/0225462 A1 * | 11/2004 | Renken et al. | | 702/94 |

(Continued)

FOREIGN PATENT DOCUMENTS

WO    WO 2008005325 A2 *  1/2008  .............. H01L 21/00

OTHER PUBLICATIONS

PCT Search Report and Written Opinion for PCT App. No. PCT/US2013/067277, dated Feb. 11, 2014.

*Primary Examiner* — Christopher E Everett
(74) *Attorney, Agent, or Firm* — Joshua D. Isenberg; JDI Patent (57) ABSTRACT

Aspects of the present disclosure describe a smart docking station. The smart docking station may contain a data transfer and an electrical connection which allow a sensor wafer to be charged and to upload and download data. The smart docking station may be located at an off-track storage position above a tool. This location enables an automated materials handling system (AMHS) to retrieve the sensor wafer and deliver it to a tool requiring analysis. The sensor wafer may be stored in a smart front opening unified pod (FOUP). It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

31 Claims, 8 Drawing Sheets

(56) References Cited

U.S. PATENT DOCUMENTS

| | | | |
|---|---|---|---|
| 2004/0267501 A1* | 12/2004 | Freed et al. | 702/184 |
| 2005/0085090 A1 | 4/2005 | Mui et al. | |
| 2006/0151606 A1* | 7/2006 | Ramsey | H01L 21/67259 235/454 |
| 2006/0181242 A1* | 8/2006 | Freed et al. | 320/109 |
| 2006/0207971 A1 | 9/2006 | Moriya et al. | |
| 2007/0017896 A1 | 1/2007 | Davis et al. | |
| 2007/0183869 A1 | 8/2007 | Cho et al. | |
| 2011/0074341 A1* | 3/2011 | Jensen et al. | 320/108 |
| 2012/0059502 A1 | 3/2012 | Endo et al. | |
| 2012/0098352 A1* | 4/2012 | Takaishi | 307/104 |

\* cited by examiner

AUTOMATED INTERFACE APPARATUS AND METHOD FOR USE IN SEMICONDUCTOR WAFER HANDLING SYSTEMS

FIELD OF THE INVENTION

Embodiments of the present invention relate to an apparatus and a method for automating a wafer handling system that is capable of performing diagnostics on a tool in a cleanroom environment.

BACKGROUND OF THE INVENTION

Sensor wafers are used to perform process characterizations of a tool. A sensor wafer may measure many different parameters of the process, such as, but not limited to, substrate temperature profiles, and report those back to an engineer. Originally sensor wafers were used as a tool for research and development. The information provided to the engineer enabled him to refine or improve a processing step. However, with tighter tolerances and increased demands on product yield, sensor wafers have also become a valuable process monitoring tool.

A sensor wafer may be deployed to help identify problems in a processing step when the processing step begins to produce results that exceed predetermined tolerances. Currently, the use of a sensor wafer requires a substantial downtime for the tool being characterized. In order to deploy a sensor wafer in a production setting, a technician must first take the tool offline. Then he must get a cart in order to carry the front opening unified pod (FOUP) housing the sensor wafer. After manually delivering the FOUP to the tool, the sensor wafer must be processed under the desired conditions. Thereafter, the technician must download the data logged by the sensor wafer to a laptop. The technician then needs to reassign the tool back into production. This process may take approximately 3-4 hours under ideal conditions.

Consequently, sensor wafers are typically only utilized when a processing step begins to produce devices that exceed specified tolerances. However, it would be useful to minimize the time a tool is taken off-line in order to allow for process analyses before a process begins producing devices that exceed the specified tolerances. It is within this context that embodiments of the present invention arise.

BRIEF DESCRIPTION OF THE DRAWINGS

Objects and advantages of the invention will become apparent upon reading the following detailed description and upon reference to the accompanying drawings in which.

DESCRIPTION OF THE SPECIFIC EMBODIMENTS

In the following Detailed Description, reference is made to the accompanying drawings, which form a part hereof, and in which is shown by way of illustration specific embodiments in which the invention may be practiced. The drawings show illustrations in accordance with examples of embodiments, which are also referred to herein as "examples". The drawings are described in enough detail to enable those skilled in the art to practice the present subject matter. The embodiments can be combined, other embodiments can be utilized, or structural, logical, and electrical changes can be made without departing from the scope of what is claimed. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated. The following detailed description, therefore, is not to be taken in a limiting sense, and the scope of the present invention is defined by the appended claims.

According to aspects of the present disclosure, a sensor wafer may be housed in a sensor FOUP. The sensor FOUP may contain data transfer connections and an electrical connection that allows the sensor wafer to be charged and to upload and download data to the sensor wafer. The sensor FOUP may also contain similar connections which allow the sensor FOUP to be charged and to upload and download data to a smart docking station. The smart docking station may be located at an off-track storage position above a tool. This location enables an automated materials handling system (AMHS) to retrieve the sensor FOUP and deliver the sensor FOUP to a desired tool.

According to additional aspects of the present disclosure, the smart docking station may also be incorporated into a substrate processing tool. This configuration allows for the sensor wafer to be transported in a FOUP that does not contain an electrical and data transfer connection. The data may be uploaded and downloaded from the sensor wafer directly to the smart docking station within the tool. Additionally, the smart docking station may provide an electrical connection directly to the sensor wafer in order to charge the sensor wafer. This aspect of the present disclosure allows for the sensor wafer to be transported to a tool that needs to be analyzed with the use of a standard FOUP used to transport wafers.

An additional aspect of the present disclosure describes the automated system that may be used to implement an analysis of a tool with a sensor wafer. According to this aspect of the present disclosure a factory automation (FA) server may provide a smart docking station with a mission for a sensor wafer. The smart docking station may upload the mission to the sensor wafer. The FA server may also deliver a recipe to the tool being analyzed. As used herein, the "tool being analyzed" may also be referred to as a "device under test" (DUT). The FA server may also instruct a robotic wafer delivery system an AMHS to retrieve the sensor wafer from the smart docking station and deliver it to the DUT. Once the sensor wafer has been delivered to the DUT, the recipe is run on the sensor wafer and the processing conditions are logged and stored in a memory of the sensor wafer. When the recipe is complete, the DUT may send a signal to the FA server indicating that the sensor wafer may be returned to a smart docking station. The FA server may then instruct the AMHS to retrieve the sensor wafer from the DUT and deliver it to an available smart docking station. When docked at a smart docking station, the sensor wafer may download the logged data to the smart docking station. The smart docking station may thereafter transmit the data to a sensor wafer server. In order to access the logged data, the FA server may then request the logged data from the sensor wafer server.

Figure 1A:
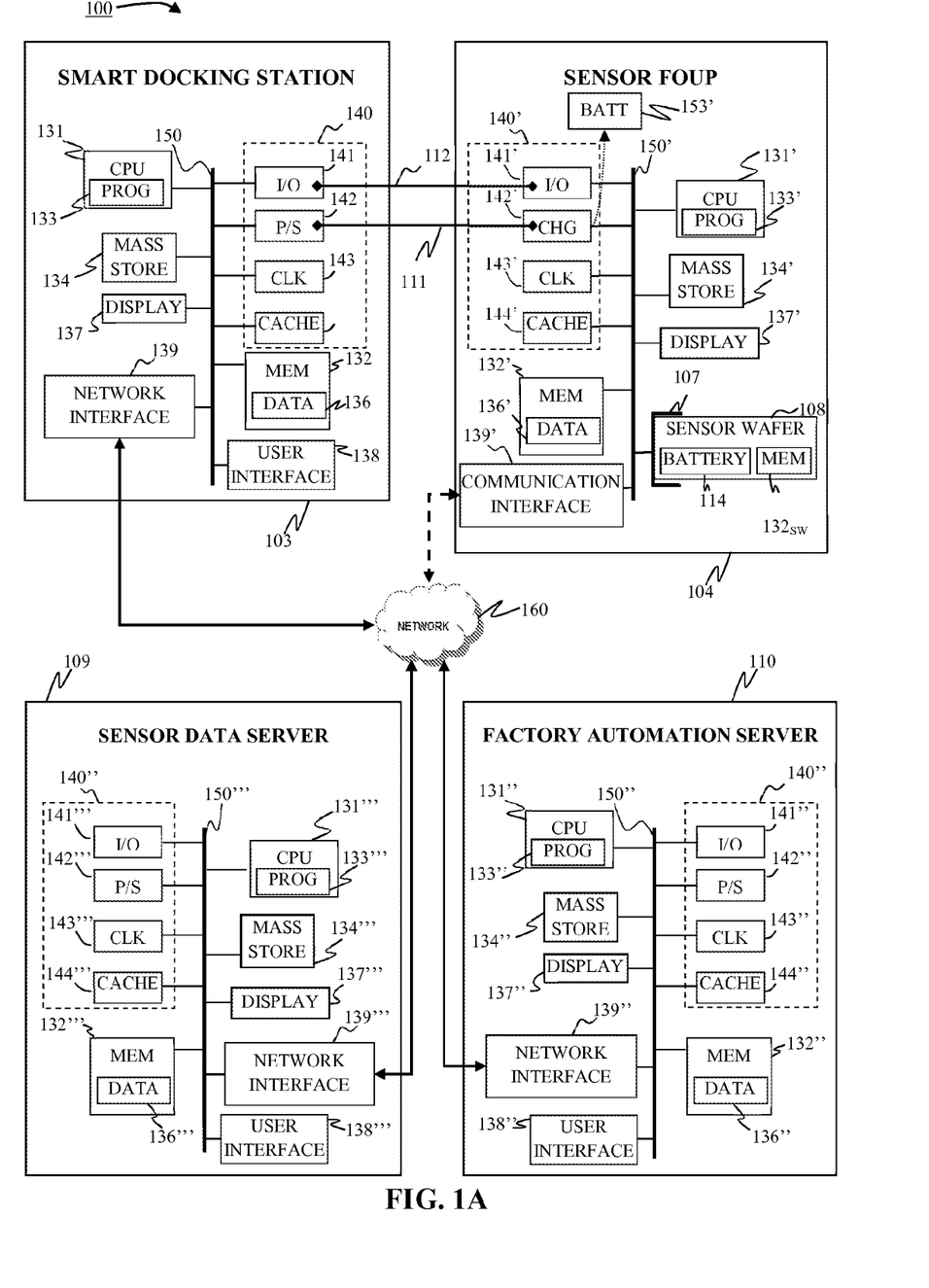
FIG. 1A is a schematic diagram of an automated sensor wafer system according to an aspect of the present disclosure.

FIG. 1A is a schematic diagram of an automated tool diagnostic system 100 according to an aspect of the present disclosure. A smart docking station 103 may be accessed by a sensor wafer server 109 and an FA server 110 over a network 160. The smart docking station 103 may be one of a plurality of smart docking stations 103 accessible by the FA server 110. The FA server 110 may also communicate with an AMHS 106 (not shown) and a DUT 118 (not shown) over the network 160. It is noted that the sensor wafer server 109 and the FA server 110 may be implemented as virtualized machines running on the same hardware, e.g., a common general-purpose computer running different virtual machines using specially configured software. Alternatively, the sensor wafer server 109 and the FA server 110 may be implemented on separate pieces of hardware.

A transportable sensor FOUP 104 may be configured to receive a sensor wafer 108 and retain the sensor wafer as the FOUP is transported, e.g., from one tool to another, from a tool to docking station, or from a docking station to a tool. The sensor FOUP 104 may have an electrical connection 111 that connects the sensor FOUP 104 to the smart docking station 103. The electrical connection 111 may be configured to charge a battery in the sensor FOUP 104. By way of example, and not by way of limitation, the electrical connection 111 may connect a power supply 142 of the smart docking station 103 to the battery charging controller 142' of the sensor FOUP 104. The battery charging controller 142' in turn charges and maintains the battery 153'. The sensor FOUP 104 may also have a data connection 112 that connects the sensor FOUP 104 to the smart docking station 103. The data connection 112 may be configured to allow data to be uploaded to or downloaded from the smart docking station 103. By way of example, and not by way of limitation, the data connection 112 may connect an input/output circuit 141 of the smart docking station 103 to an input/output circuit 141' of the sensor FOUP 104. The electrical connection 111 and the data connection 112 may be implemented as a single connection capable of providing both an electrical path and a data path between the smart docking station 103 and the sensor FOUP 104. By way of example, and not by way of limitation, the single connection may be a USB connection. Again by way of example, and not by way of limitation, the data path may be implemented wirelessly using radiofrequency (RF) or infrared (IR) data paths. Examples of RF data paths include Bluetooth and examples of infrared data paths include IRDA.

Smart docking station 103 may include a central processor unit (CPU) 131. By way of example, a CPU 131 may include one or more processors, which may be configured according to, e.g., a dual-core, quad-core, multi-core, or Cell processor architecture. Smart docking station 103 may also include a memory 132 (e.g., RAM, DRAM, ROM, and the like). The CPU 131 may execute a process-control program 133, portions of which may be stored in the memory 132. The smart docking station 103 may also include well-known support circuits 140, such as input/output (I/O) circuits 141, power supplies (P/S) 142, a clock (CLK) 143, and cache 144. The smart docking station 103 may optionally include a mass storage device 134 such as a disk drive, CD-ROM drive, tape drive, or the like to store programs and/or data. The smart docking station 103 may also optionally include a display unit 137 and a user interface unit 138 to facilitate interaction between the smart docking station 103 and a user who requires direct access to the smart docking station 103. The display unit 137 may be in the form of a cathode ray tube (CRT) or flat panel screen that displays text, numerals, or graphical symbols. The user interface unit 138 may include a keyboard, mouse, joystick, light pen, or other device. The smart docking station 103 may include a network interface 139, configured to enable the use of Bluetooth, Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The smart docking station 103 may send and receive data and/or requests for files via one or more data packets over the network 160.

The preceding components may exchange signals with each other via an internal system bus 150. The smart docking station 103 may be a general purpose computer that becomes a special purpose computer when miming code that implements embodiments of the present invention as described herein.

The sensor FOUP 104 may include a central processor unit (CPU) 131'. By way of example, a CPU 131' may include one or more processors, which may be configured according to, e.g., a dual-core, quad-core, multi-core, or Cell processor architecture. The sensor FOUP 104 may also include a memory 132' (e.g., RAM, DRAM, ROM, and the like). The CPU 131' may execute a process-control program 133', portions of which may be stored in the memory 132'. The sensor FOUP 104 may also include well-known support circuits 140', such as input/output (I/O) circuits 141', battery management controller (CHG) 142', a clock (CLK) 143', and cache 144'. The sensor FOUP 104 contains a battery 153' which is the power source for the sensor FOUP 104 while performing a mission. The sensor FOUP 104 may optionally include a mass storage device 134' such as a disk drive, CD-ROM drive, tape drive, or the like to store programs and/or data. The sensor FOUP 104 may also optionally include a display unit 137' and a user interface unit 138' to facilitate interaction between the sensor FOUP 104 and a user who requires direct access to the sensor FOUP 104. The display unit 137' may be in the form of a Liquid Crystal Display (LCD) or flat panel screen that displays text, numerals, or graphical symbols. The user interface unit 138' may include a keyboard, mouse, joystick, light pen, or other device. The sensor FOUP 104 may include a network interface 139', configured to enable the use of Wi-Fi, Bluetooth, an Ethernet port, or other communication methods. It is noted that in some implementations, the network interface 139' may be configured to establish a wireless communication link between the sensor FOUP 104 and a remote server independent of the smart docking station 103.

The network interface 139' may incorporate suitable hardware, software, firmware or some combination of two or more of these to facilitate communication via an electronic communications network 160. The network interface 139' may be configured to implement wired or wireless communication over local area networks and wide area networks such as the Internet. The sensor FOUP 104 may send and receive data and/or requests for files via one or more data packets over the network 160.

The sensor FOUP 104 may include one or more receptacles 107 configured to receive a sensor wafer 108. The receptacle 107 may include a charging contact configured to provide an electrical charge to a battery 114 within the sensor wafer 108. The sensor FOUP 104 may be configured to exchange data with the sensor wafer 108. For example, the FOUP 104 may include a wireless transceiver, e.g., based on radiofrequency ID (RFID), infrared (IR), electromagnetic induction, or other suitable technology configured to transmit data to and/or receive data from the sensor wafer 108 via a corresponding wireless transceiver. Alternatively, the receptacle 107 may include a data contact configured to transfer data to and/or from a memory $132_{SW}$ in the sensor wafer 108. It is noted that a sensor wafer 108 is shown in FIG. 1A for the purpose of illustrating certain aspects of the disclosure. However, the sensor wafer 108 is not, strictly speaking a part of the sensor FOUP 104. Instead, the sensor wafer 108 may be regarded as a workpiece upon which the sensor FOUP operates.

The preceding components may exchange signals with each other via an internal system bus 150'. The sensor FOUP 104 may be a general purpose computer that becomes a special purpose computer when miming code that implements embodiments of the present invention as described herein. By way of example, and not by way of limitation, the sensor FOUP 104 may be a SmartFOUP, sold by KLA-Tencor of Milpitas, Calif.

FA server 110 may include a central processor unit (CPU) 131". By way of example, a CPU 131" may include one or more processors, which may be configured according to, e.g., a dual-core, quad-core, multi-core, or Cell processor architecture. FA server 110 may also include a memory 132" (e.g., RAM, DRAM, ROM, and the like). The CPU 131" may execute a process-control program 133", portions of which may be stored in the memory 132". The FA server 110 may also include well-known support circuits 140", such as input/output (I/O) circuits 141", power supplies (P/S) 142", a clock (CLK) 143", and cache 144". The FA server 110 may optionally include a mass storage device 134" such as a disk drive, CD-ROM drive, tape drive, or the like to store programs and/or data. The FA server 110 may also optionally include a display unit 137" and a user interface unit 138" to facilitate interaction between the FA server 110 and a user who requires direct access to the FA server 110. The display unit 137" may be in the form of a cathode ray tube (CRT) or flat panel screen that displays text, numerals, or graphical symbols. The user interface unit 138" may include a keyboard, mouse, joystick, light pen, or other device. The FA server 110 may include a network interface 139", configured to enable the use of Wi-Fi, an Ethernet port, or other communication methods.

The network interface 139" may incorporate suitable hardware, software, firmware or some combination of two or more of these to facilitate communication via an electronic communications network 160. The network interface 139" may be configured to implement wired or wireless communication over local area networks and wide area networks such as the Internet. The FA server 110 may send and receive data and/or requests for files via one or more data packets over the network 160.

The preceding components may exchange signals with each other via an internal system bus 150". The FA server 110 may be a general purpose computer that becomes a special purpose computer when running code that implements embodiments of the present invention as described herein.

Sensor wafer server 109 may include a central processor unit (CPU) 131'". By way of example, a CPU 131'" may include one or more processors, which may be configured according to, e.g., a dual-core, quad-core, multi-core, or Cell processor architecture. Sensor wafer server 109 may also include a memory 132' (e.g., RAM, DRAM, ROM, and the like). The CPU 131' may execute a process-control program 133', portions of which may be stored in the memory 132'". The sensor wafer server 109 may also include well-known support circuits 140'", such as input/output (I/O) circuits 141', power supplies (P/S) 142', a clock (CLK) 143', and cache 144'". The sensor wafer server 109 may optionally include a mass storage device 134'" such as a disk drive, CD-ROM drive, tape drive, or the like to store programs and/or data. The sensor wafer server 109 may also optionally include a display unit 137'" and a user interface unit 138' to facilitate interaction between the sensor wafer server 109 and a user who requires direct access to the sensor wafer server 109. The display unit 137'" may be in the form of a cathode ray tube (CRT) or flat panel screen that displays text, numerals, or graphical symbols. The user interface unit 138'" may include a keyboard, mouse, joystick, light pen, or other device. The sensor wafer server 109 may include a network interface 139'", configured to enable the use of Wi-Fi, an Ethernet port, or other communication methods.

The network interface 139'" may incorporate suitable hardware, software, firmware or some combination of two or more of these to facilitate communication via an electronic communications network 160. The network interface 139'" may be configured to implement wired or wireless communication over local area networks and wide area networks such as the Internet. The sensor wafer server 109 may send and receive data and/or requests for files via one or more data packets over the network 160.

The preceding components may exchange signals with each other via an internal system bus 150'. The sensor wafer server 109 may be a general purpose computer that becomes a special purpose computer when miming code that implements embodiments of the present invention as described herein. By way of example, and not by way of limitation, the sensor wafer server may be a Klarity ACE XP system sold by KLA Tencor of Milpitas, Calif.

Figure 1B:
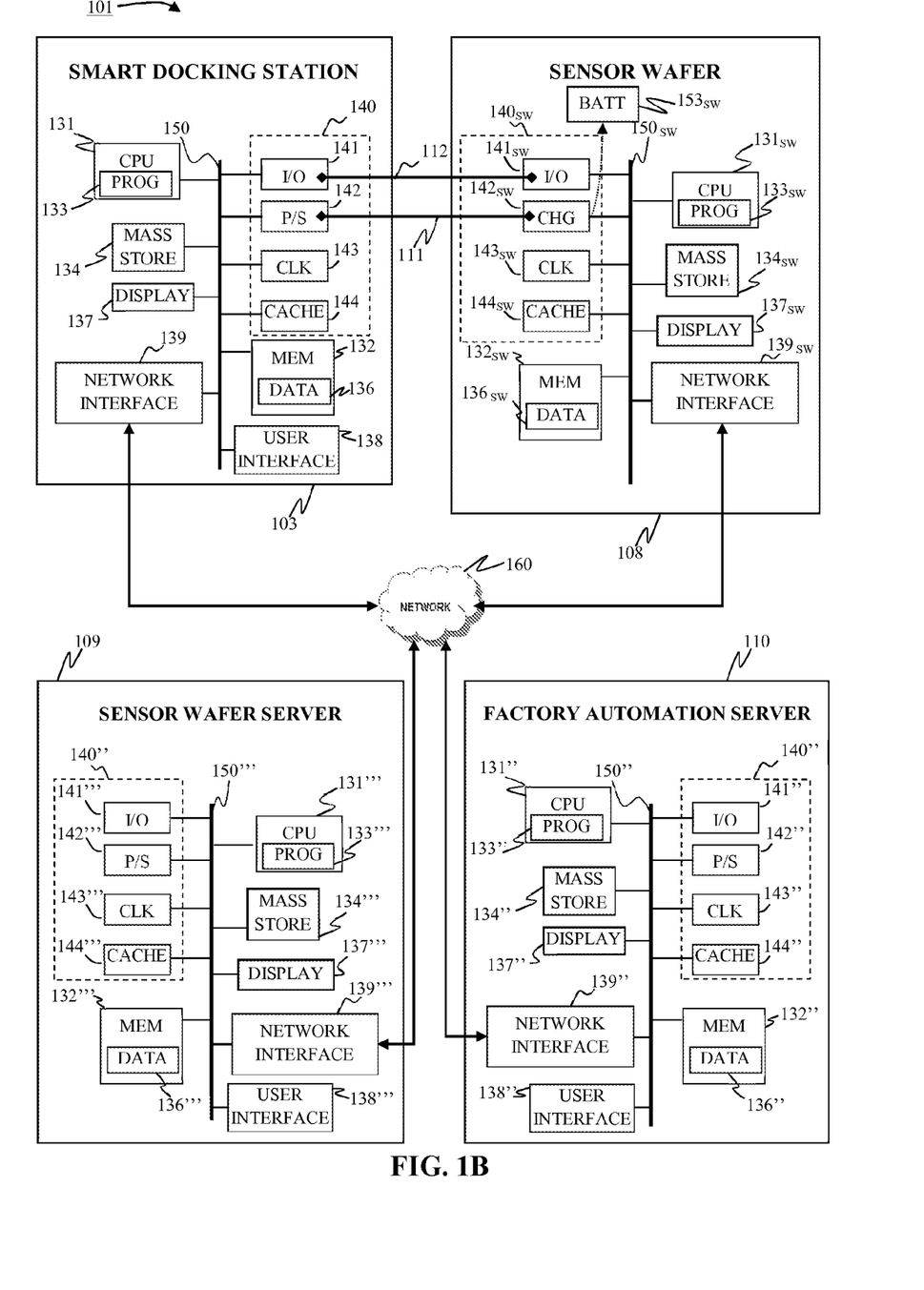
FIG. 1B is a schematic diagram of an automated sensor wafer system according to an additional aspect of the present disclosure.

FIG. 1B is a schematic diagram of an automated tool diagnostic system 101 according to an additional aspect of the present disclosure. Automated diagnostic system 101 is similar to automated diagnostic system 100 except that the sensor wafer 108 is docked directly to the smart docking station 103 without being housed in a sensor FOUP 104. The smart docking station 103 may be accessed by a sensor wafer server 109 and an FA server 110 over a network 160. The smart docking station 103 may be one of a plurality of smart docking stations 103 accessible by the FA server 110. The FA server 110 may also communicate with an AMHS 106 (not shown) and a DUT 118 (not shown) over the network 160. Sensor wafer 108 may be one of a plurality of sensor wafers 108.

Sensor wafer 108 may include a central processor unit (CPU) $131_{SW}$. By way of example, a CPU $131_{SW}$ may include one or more processors, which may be configured according to, e.g., a dual-core, quad-core, multi-core processor architecture. Sensor wafer 108 may also include a memory $132_{SW}$ (e.g., RAM, DRAM, ROM, and the like). The CPU $131_{SW}$ may execute a process-control program $133_{SW}$, portions of which may be stored in the memory $132_{SW}$. The sensor wafer 108 may also include well-known support circuits $140_{SW}$, such as input/output (I/O) circuits $141_{SW}$, a battery charger controller (CHG) $142_{SW}$ for a battery $153_{SW}$, a clock (CLK) $143_{SW}$, and cache $144_{SW}$. The sensor wafer 108 may optionally include a mass storage device $134_{SW}$ such as a disk drive, CD-ROM drive, tape drive, or the like to store programs and/or data. The sensor wafer 108 may also optionally include a display unit $137_{SW}$ and a user interface unit $138_{SW}$ to facilitate interaction between the sensor wafer 108 and a user who requires direct access to the sensor wafer 108. The display unit $137_{SW}$ may be in the form of a cathode ray tube (CRT) or flat panel screen that displays text, numerals, or graphical symbols. The user interface unit $138_{SW}$ may include a keyboard, mouse, joystick, light pen, or other device. The sensor wafer 108 may optionally include a network interface $139_{SW}$, configured to enable the use of Wi-Fi, an Ethernet port, or other communication methods.

The network interface $139_{SW}$ may incorporate suitable hardware, software, firmware or some combination of two or more of these to facilitate communication via an electronic communications network 160. The network interface $139_{SW}$ may be configured to implement wired or wireless communication over local area networks and wide area networks such as the Internet. The sensor wafer 108 may send and receive data and/or requests for files via one or more data packets over the network 160.

The preceding components may exchange signals with each other via an internal system bus $150_{SW}$. The sensor wafer 108 may be regarded as a general purpose computer that becomes a special purpose computer when running code that implements aspects the present disclosure as described herein. By way of example, and not by way of limitation, the sensor wafer 108 may be a sensor substrate such as the SensArray series of sensor substrates, the EtchTemp sensor, the BakeTemp sensor, the MaskTemp sensor, and the WetTemp-LP, each sold by KLA-Tencor of Milpitas, Calif.

Figure 2A:
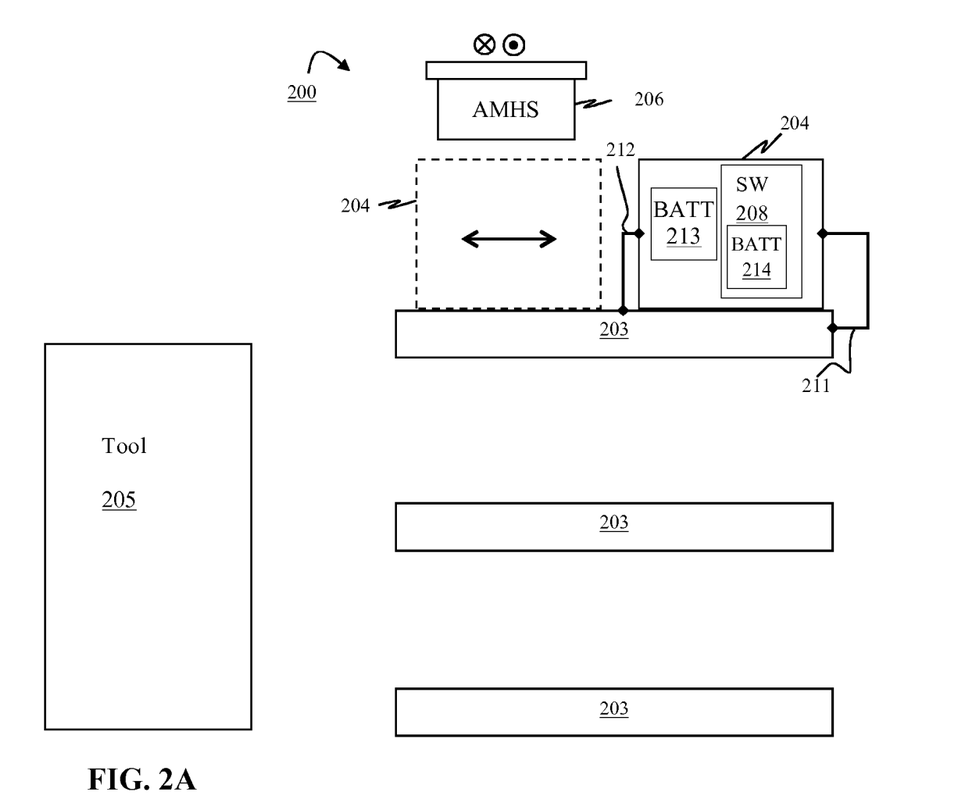
FIG. 2A is a diagram of a smart docking station located at an off-track storage location above a tool according to an aspect of the present disclosure.

FIG. 2A is a diagram of the mechanical components of an automated tool diagnostic system 200 according to an aspect of the present disclosure. Diagnostic system 200 may utilizes a smart docking station 203 that may be located at a height higher than a tool 205, at floor level, or at some intermediate level, such as table-top level. By way of example, the tool 205 may be any tool used in a fabrication facility, such as a review tool, or a processing tool. It should be noted that smart docking station 203 does not need to be directly above a tool 205. The smart docking station 203 may also be located in an off-track storage location. The off-track storage location may be a shelf that is located adjacent to the main pathways used by the AMHS 206, but are still accessible by the AMHS 206. This real estate is relatively inexpensive in a fabrication facility since the location is off of the floor, and outside of the main pathways of the AMHS 206. As such, this choice of location for a smart docking station 203 may allow for multiple smart docking stations 203 to be utilized in a single facility at a minimum cost. While the real estate is more expensive if the smart docking station 203 is located elsewhere, the smart docking station 203 may be located at any other location accessible by a robotic wafer delivery system, such as an AMHS 206 in the form of an overhead track (OHT) system. It is noted for the sake of clarity that in FIG. 2A, the AMHS moves a sensor FOUP perpendicular to the plane of the drawing and the docking station includes a mechanism that can translate the FOUP parallel to the plane of the drawing. It should be noted that a robotic wafer delivery system may also include alternative FOUP delivery systems, wafer transporting robots, or any combination thereof.

Smart docking station 203 may be configured to provide a docking location for a sensor FOUP 204. When a sensor FOUP 204 is docked at a smart docking station 203, a data connection 212 and an electrical connection 211 may be made between the sensor FOUP 204 and the smart docking station 203. The data connection 212 may allow for the smart docking station 203 to deliver data to the sensor FOUP 204. By way of example and not by way of limitation, the data connection 212 may be a USB connection, a wireless connection, or an Ethernet connection. By way of example, the data transferred over the data connection 212 may be a mission that a sensor wafer 208 within the sensor FOUP 204 may need to execute. The sensor FOUP 204 may be further configured to deliver the data received from the smart docking station 203 to a sensor wafer 208 housed within the sensor FOUP 204. Further, the sensor FOUP 204 may be configured to download data from the sensor wafer 208 housed in the sensor FOUP 204 and deliver the downloaded data to the smart docking station 203 over the data connection 212. By way of example and not by way of limitation, the downloaded data may be data that has been logged by the sensor wafer 208 while it was executing a mission. Additionally, the sensor FOUP 204 may be able to deliver data to the smart docking station 203 informing the smart docking station 203 of the identification number of the sensor wafer 208 or identification numbers of the sensor wafers 208 that are presently stored within the sensor FOUP 204.

The electrical connection 211 may allow the smart docking station 203 to charge a battery 213 within the sensor FOUP 204. Additionally, the sensor FOUP 204 may be configured to provide a charge to a battery 214 within a sensor wafer 208 stored in the sensor FOUP 204. By way of example, the electrical connection may be a USB connection. The electrical connection 211 may also be the same connection as the data connection 212.

Figure 2B:
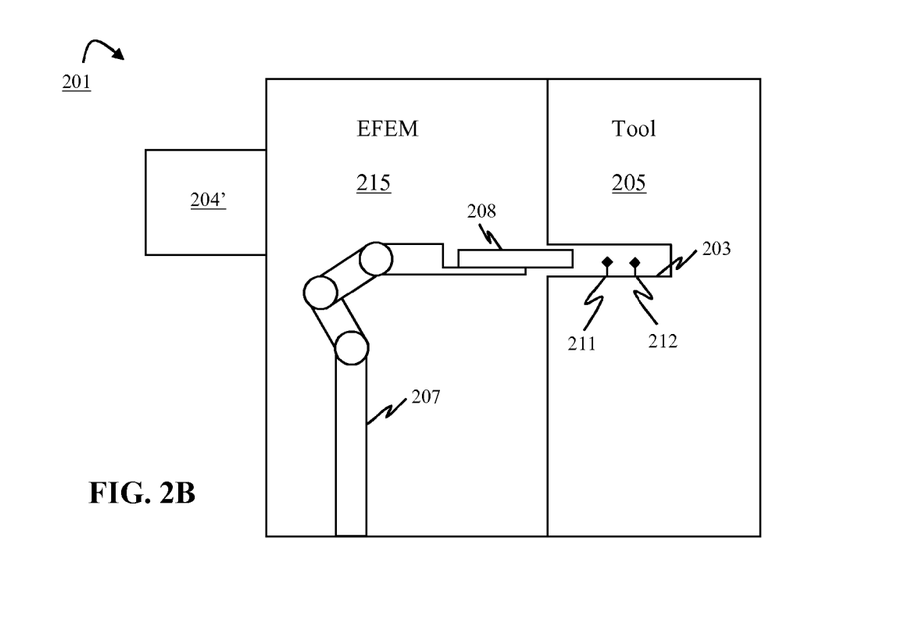
FIG. 2B is a diagram of a smart docking station located within a tool according to an aspect of the present disclosure.

FIG. 2B is a diagram of the mechanical components of an automated tool diagnostic system 201 according to an additional aspect of the present disclosure. Automated diagnostic system 201 utilizes a smart docking station 203 that is located within a tool 205. By utilizing available space in a preexisting substrate processing tool 205, no additional real estate is needed for this aspect of the present disclosure.

In principle any tool might be configured to accommodate a sensor wafer and its associated support to implement the functions of the smart docking station 203. It is particularly convenient to implement these functions in a tool that already includes an equipment front end module (EFEM) interface that is suitable for an added location. By way of example, and not by way of limitation, the tool 205 may be a diagnostic inspection tool, such as a macro inspection tool or surface inspection tool.

Additionally, the sensor wafer 208 may be docked directly on the smart docking station 203 without being stored in a sensor FOUP 204. Therefore, the sensor wafer 208 may be transported in a regular FOUP 204' that does not require electrical 211 and data connections 212. The hardware and software of the smart docking station 203, such as, but not limited to, the CPU 131 and the memory 132, may be separate or logically separate from the hardware and software of the tool 205. Alternatively, the hardware and software of the smart docking station 203 may be integrated, or partially integrated, into the hardware and software of the tool 205.

In order to transport the sensor wafer 208, the smart docking station must be accessible to a robotic wafer delivery system. As used herein, the term "robotic wafer delivery system" may refer to any robotic devices that physically move a sensor wafer 208, a sensor FOUP 204, a FOUP 204', or any combination thereof, from one location to another. By way of example, and not by way of limitation, a robotic wafer delivery system may include a system for delivering FOUPS and/or one or more wafer transporting robot. By way of example, and not by way of limitation, a system for delivering FOUPS may be an AMHS. By way of example, and not by way of limitation, a wafer transporting robot may be a selective compliant articulated robot arm (SCARA). According to the aspects of the present disclosure depicted in FIG. 2B, the robotic wafer delivery system may be comprised of a wafer transporting robot 207 and an AMHS (not shown). The wafer transporting robot 207 may be used to retrieve the sensor wafer 208 from the smart docking station 203 and deliver it to a FOUP 204'. The wafer transporting robot 207 may be located in an equipment front end module (EFEM) 215 that is attached to the tool 205. Once the sensor wafer has been delivered to the FOUP 204', an AMHS may deliver the FOUP 204' to the DUT.

The smart docking station 203 may have a data connection 212 that connects the sensor wafer 208 to the smart docking station 203. By way of example, and not by way of limitation, the data connection 212 may be a USB connection, a wireless connection, or an Ethernet connection. By way of example, the data transmitted over the data connection 212 may be a mission that a sensor wafer 208 may need to execute. Further, the smart docking station 203 may be configured to download data from the sensor wafer 208 to the smart docking station 203 through the data connection 212. By way of example and not by way of limitation, the downloaded data may be data that has been logged by the sensor wafer 208 while it was executing a mission. Additionally, the sensor wafer 208 may be able to deliver data to the smart docking station 203 informing the smart docking station 203 of the identification number of the sensor wafer 208 or identification numbers of the sensor wafers 208 that are presently docked at the smart docking station 203.

The smart docking station 203 may also have an electrical connection 211 that is configured to provide a charge to a battery 214 (not shown) within the sensor wafer 208. By way of example, the electrical connection may be a USB connection. The electrical connection 211 may be the same connection as the data connection 212.

FIGS. 3A-3F are process flow diagrams of the automated tool diagnostic system 300 according to an aspect of the present disclosure. In the figures, solid lines indicate the transfer of data over the network 160, and the dotted lines indicate physical motion of a component.

Figure 3A:
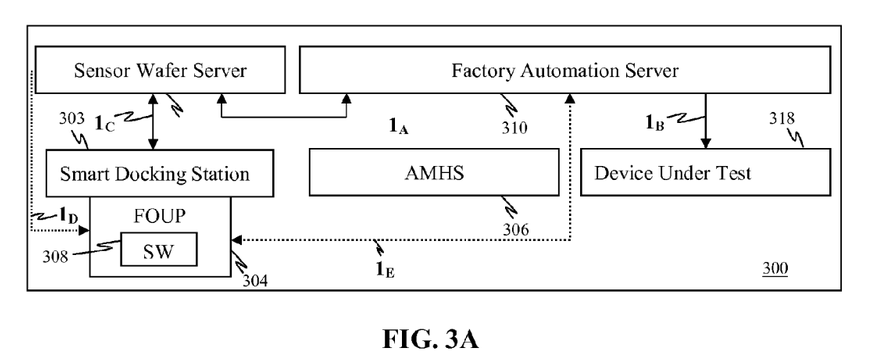
FIGS. 3A-3F are process flow diagrams of an automated sensor wafer system depicting the flow of data and the physical movement of the sensor wafer according to an aspect of the present disclosure.

FIG. 3A depicts the process at an initial starting state. At this starting state, a sensor wafer 308 is housed within a sensor FOUP 304. The sensor FOUP is currently docked at a smart docking station 303. There may exist one or more smart docking station(s) 303 with or without attached smart FOUP 304. In this starting state, the smart docking station 303 may be providing a charge to the batteries 213 in the sensor FOUP 304. The sensor FOUP 304 may also be providing a charge to the battery 214 in the sensor wafer 308. The process is initiated by the FA server 310 sending a mission request to the smart docking station 303 over the network 160 as indicated by arrow $1_A$. By way of example, and not by way of limitation, the mission may include instructions for the sensor wafer 308 indicating which tool needs to be analyzed, what process needs to be analyzed, which wafer is needed for the analysis, and what data needs to be logged during the analysis.

The FA server 310 may also deliver a recipe to the DUT 318 over the network 160 as indicated by arrow $1_B$. By way of example, and not by way of limitation, the recipe may include the processing conditions that need to be used for the analysis and the identification number of the sensor wafer 308 that will be logging the data. The recipe may be delivered to the DUT 318 before, after, or at the same time the mission is delivered to the smart docking station 303.

The sensor wafer data server 319 may instruct the smart docking station 303 to have the sensor FOUP 304 to start a mission on the wafer 308. This may be done over the network 160 as indicated by the arrow $1_C$. The smart docking station 303 may then deliver the mission to the sensor FOUP 304 over the data connection 212. The sensor FOUP 304 may optionally send a confirmation message back to the smart docking station 303 that the appropriate sensor wafer 308 is located within the sensor FOUP 304. The smart docking station 303 may then transmit the confirmation back to the sensor wafer data server 319. This information may then be reconveyed to the FA server 310 via the network 160 as indicated by arrow $1_A$. If the sensor wafer assigned to carry out the mission is not located in the smart docking station 303 that received the instruction from the FA server 310, then an exception may be delivered to the FA server 310.

In alternative implementations, the sensor FOUP 304 may be configured to communicate directly with the sensor wafer data server 319, e.g., by a wireless link. For example, the sensor FOUP may receive the mission wirelessly as indicated by dotted arrow $1_D$ instead of receiving the mission via the smart docking station 303. In such implementations, the sensor FOUP 304 may also be configured to transmit the confirmation back to the sensor wafer data server 319 or communicate directly with the FA server 310 via wireless link, as indicated by dotted arrow $1_E$.

Figure 3B:
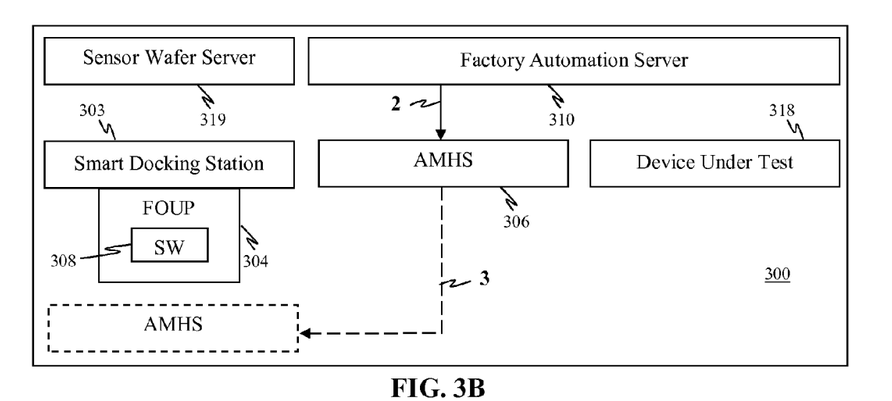
Figure 3C:
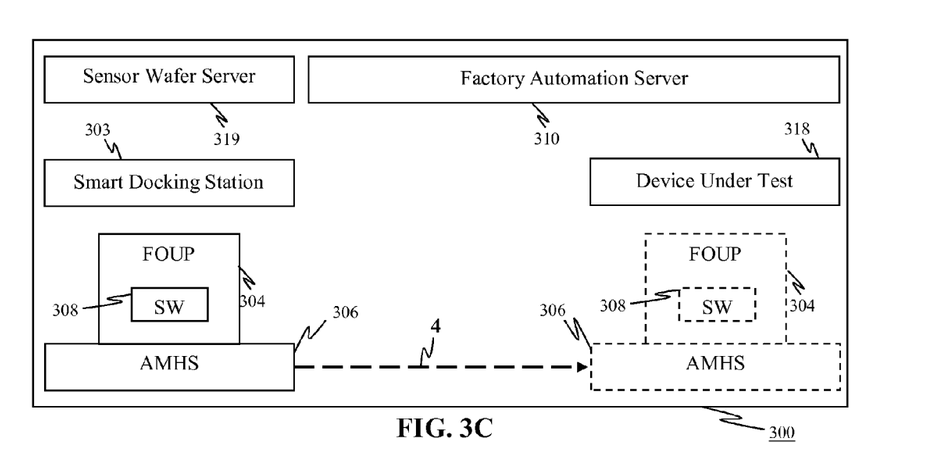

Once the recipe and the mission have been delivered, the FA server 310 may send instructions over the network to the AMHS 306 instructing it to retrieve the sensor FOUP 304 and deliver it to the DUT 318 as indicated by arrow 2 in FIG. 3B. The instructions sent to the AMHS 306 may also include a priority level for the analysis. By way of example, if the analysis needs to be done immediately, a high priority level may be assigned to the task, or if the analysis is not critical, a low priority may be assigned to the task. The AMHS 306 travels to the sensor smart docking station 303 as indicated by the dashed arrow 3 in FIG. 3B. Next, in FIG. 3C, the AMHS 306 retrieves the sensor FOUP 304 housing the sensor wafer 308 and delivers it to the DUT 318 as indicated by the dashed arrow 4 in FIG. 3C. The electrical connection 211 and the data connection 212 between the smart docking station 303 and the sensor FOUP 304 are each disconnected when the AMHS 306 moves the sensor FOUP 304 to the DUT 318.

Figure 3D:
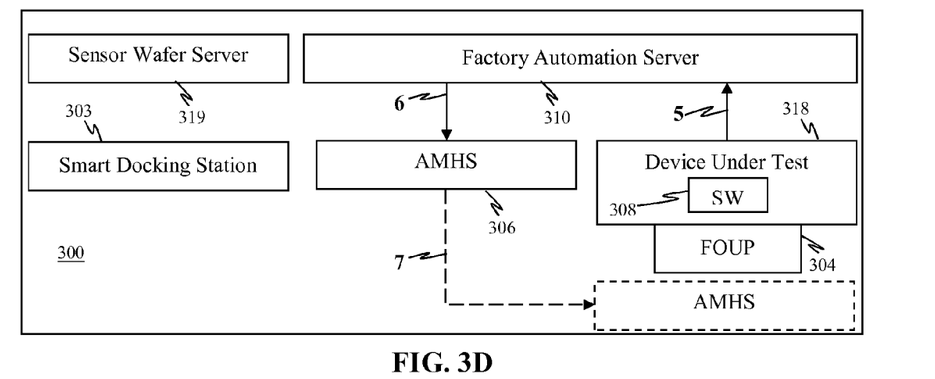

FIG. 3D depicts the process once the sensor FOUP 304 has been delivered to the DUT 318. The DUT 318 may extract the sensor wafer 308 from the sensor FOUP 304 and begin executing the recipe. By way of example, and not by way of limitation, the DUT may extract the sensor wafer 308 in a manner similar to how a wafer would be processed under normal processing conditions. This may include using a wafer transporting robot, such as a SCARA, or by manually extracting the sensor wafer from the sensor FOUP 304.

Figure 3E:
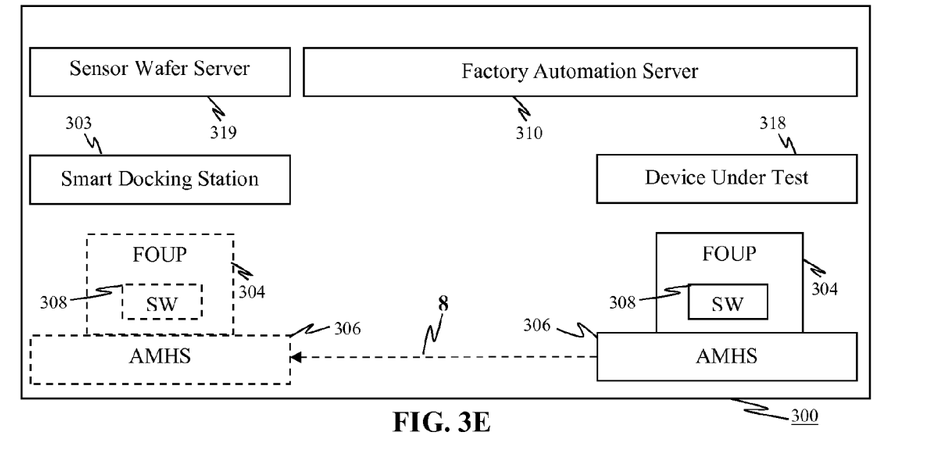

Once the recipe has been completed, the DUT 318 may deliver the sensor wafer back to the sensor FOUP 304. The DUT 318 may also deliver a message to the FA server 310 over the network 160 indicating that the analysis has been competed as indicated by arrow 5. The FA server 310 may then send an instruction over the network 160 instructing the AMHS 306 to retrieve the sensor FOUP 304 and deliver it back to a smart docking station 303, as indicated by arrow 6. The AMHS 306 may then travel to the DUT 318 as indicated by arrow 7 to pick up the sensor FOUP 304. It should be noted that the sensor FOUP 304 does not need to be delivered back to the same smart docking station 303 that it originated from. By way of example, and not by way of limitation, the sensor FOUP 304 may be delivered to the nearest available smart docking station 303 or a smart docking station 303 that is proximate to a tool where the next analysis may be performed. FIG. 3E depicts the AMHS 306 retrieving the sensor FOUP 304 and delivering it to a smart docking station 303 as indicated by arrow 8.

When the sensor FOUP 304 is docked at the smart docking station 303 and the data connection 212 has been reestablished, the data logged by the sensor wafer 308 may be downloaded by the smart docking station 303. Additionally, once the electrical connection 211 has been reestablished, the smart docking station 303 may begin providing a charge to the battery 213 in the sensor FOUP 304 and the battery 214 in the sensor wafer 308 so they are each ready for their next mission. As indicated by arrow 9, the smart docking station may then upload the logged data from the sensor wafer 308 to the sensor wafer server 319 over the network 160. In implementations where the sensor FOUP 304 is configured to communicate wirelessly, the upload of the logged data may be implemented directly between the sensor FOUP and the sensor wafer server 319 via wireless link, as indicated by the dotted arrow $9_A$. Data may optionally be sent directly from the sensor FOUP 304 to the FA server 310 by wireless link, as indicated by the dotted arrow $9_B$. The sensor wafer server 319 may save the raw data and may also process the data into a desired format. By the way of example and not by the way of limitation, the data may be processed such to extract relevant statistical summaries useful for the Fabrication facility to perform Statistical Process Charts (SPC). A data summary in a standard format such similar to Microsoft Excel® or OpenOffice™ may also be available. Excel® is a registered trademark of Microsoft Corporation of Redmond, Wash.

Figure 3F:
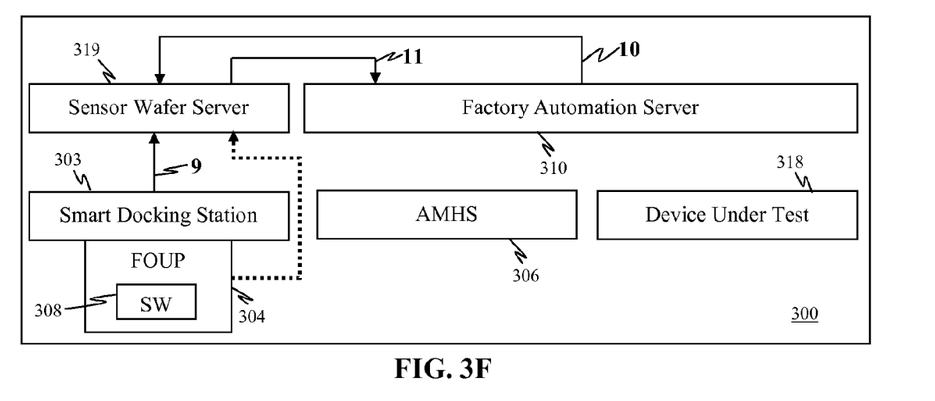

In some implementations, the FA server 310 may optionally send a request for the data to the sensor wafer server 319 over the network 160 as indicated by arrow 10 in FIG. 3F. The sensor wafer server 319 may then deliver the requested data to the FA server 310 as indicated by arrow 11. The sensor wafer server 319 may deliver the processed data, the raw data, or both to the FA server 310. According to some aspects of the present disclosure, the FA server 310 and the sensor wafer server 319 may be implemented on the same hardware, but remain logically separate. Alternatively, the FA server 310, and the sensor wafer server 319 may be implemented on separate hardware. It is further noted that there is no requirement that the FA server 310 and sensor wafer server 319 to exchange data directly.

Figure 3G:
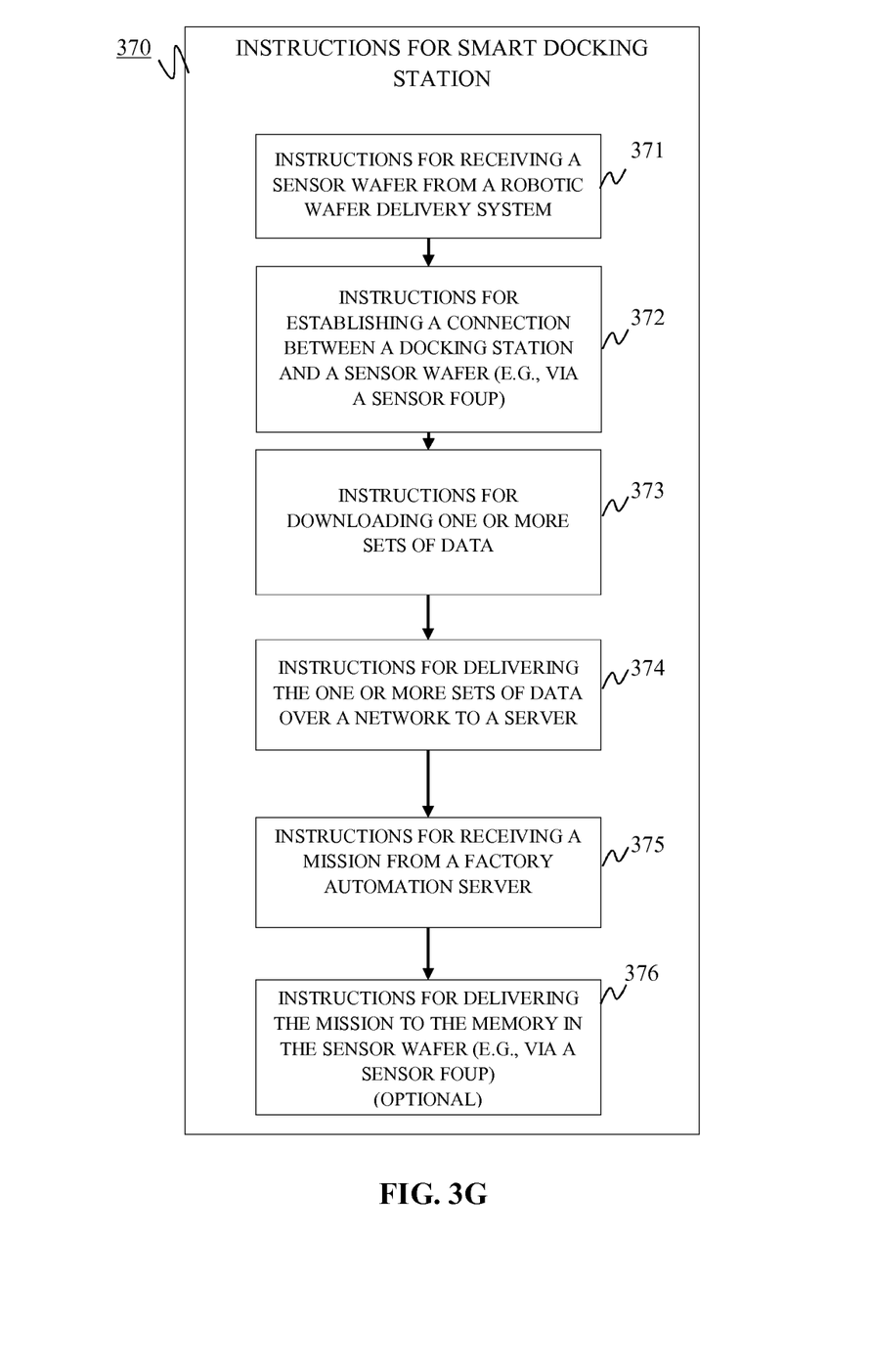
FIG. 3G is a block diagram describing computer-executable instructions for operating a docking station in accordance with aspects of the present disclosure.

As shown in FIG. 3G, a set of smart docking station instructions 370 may be implemented, e.g., by the smart docking station 303. The smart docking station instructions 370 may be formed on a non-transitory computer readable medium such as the memory 132 or the mass storage device 134. The smart docking station instructions 370 may also be part of the process control program 133. The instructions include receiving, from a robotic wafer delivery system, a sensor wafer 308 that has completed a mission and has one or more sets of data stored in its memory $132_{SW}$ at 371. Next, the smart docking station instructions 370 include establishing a data connection 312 between the smart docking station 303 and the sensor wafer 308 at 372. Next at 373, the smart docking station 303 is instructed to download the one or more sets of data from the memory $132_{SW}$ of the sensor wafer 308. Once the data has been downloaded, the instructions 370 continue by instructing the smart docking station 303 to deliver the downloaded data over the network 160 to a server at 374. Optionally, at 375 the smart docking station 303 is provided with instructions for receiving a mission from a factory automation server 310 over the network 160. Then at 376, the instructions 370 optionally include delivering the mission to the sensor wafer 308 over the data connection 312.

The reverse holds true as well. In particular, the processes indicated at 371 through 376 deal with how to transmit a command to start a mission. After a FOUP (and its wafer 308) are returned back as shown in FIG. 3F, steps 371 through 375 can be performed again but this time the mission data acquired by the sensor wafer during the mission is moved from the wafer to the FOUP.

FIGS. 4A-4F are process flow diagrams of the automated tool diagnostic system 400 according to an additional aspect of the present disclosure. In the figures, solid lines indicate the transfer of data over the network, and the dotted lines indicate physical motion of a component.

Figure 4A:
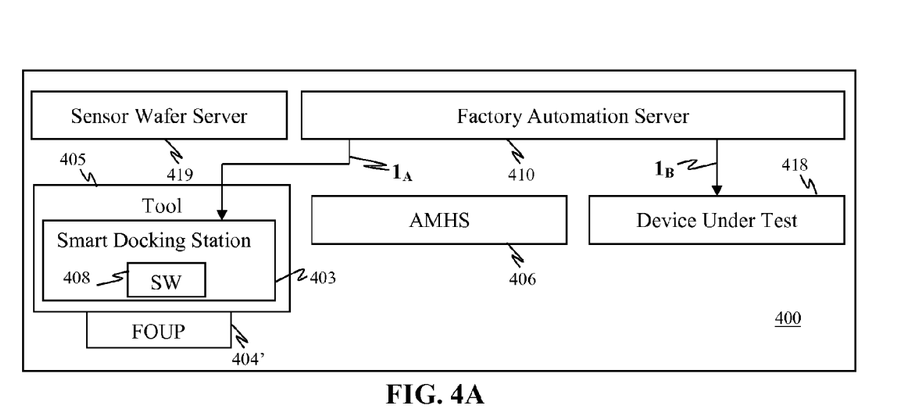
FIGS. 4A-4F are process flow diagrams of an automated sensor wafer system depicting the flow of data and the physical movement of the sensor wafer according to an additional aspect of the present disclosure.

FIG. 4A depicts the process at an initial starting state. At this starting state, a sensor wafer 408 is housed within a smart docking station 403. The smart docking station 403 may be located within a tool 405 in a cleanroom environment. A dumb FOUP 404' (i.e., a FOUP that may be used for transporting regular wafers and does not require an electrical or data connection) is currently docked at the tool 405 that houses the smart docking station 403. In this starting state, the smart docking station 403 may be providing a charge to the battery 214 in the sensor wafer 408. The process is initiated by the FA server 410 sending a mission to the smart docking station 403 over the network 160 as indicated by arrow $1_A$. By way of example, and not by way of limitation, the mission may include instructions for the sensor wafer 408 indicating which tool needs to be analyzed, what process needs to be analyzed and what data needs to be logged during the analysis. The smart docking station 403 may then deliver the mission to the sensor wafer 408 over the data connection 212. The smart docking station 403 may optionally send a confirmation message back to the FA server 410 indicating that the appropriate sensor wafer 408 is located at the smart docking station 403. If the sensor wafer 408 assigned to carry out the mission is not located at the smart docking station 403 that received the instruction from the FA server 410, then an exception may be delivered to the FA server 410.

The FA server 410 may also deliver the recipe to the DUT 418 over the network 160 as indicated by arrow $1_B$. By way of example, and not by way of limitation, the recipe may include the processing conditions that need to be used for the analysis and the identification number of the sensor wafer 408 that will be logging the data. The recipe may be delivered to the DUT 418 before, after, or at the same time the mission is delivered to the sensor wafer 408.

Figure 4B:
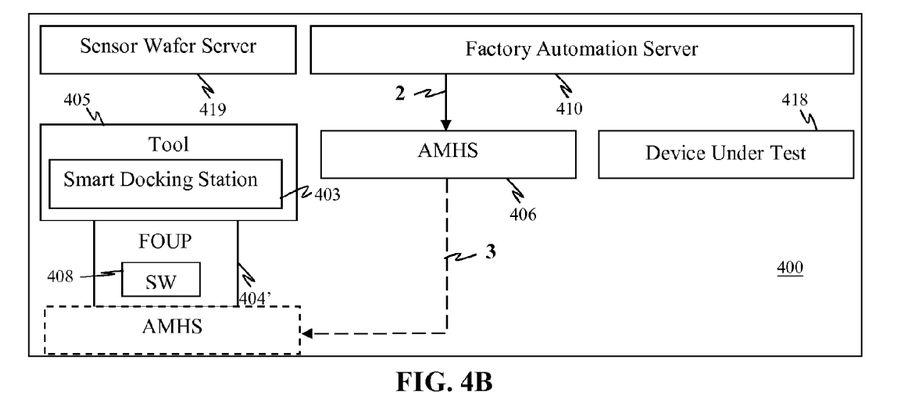
Figure 4C:
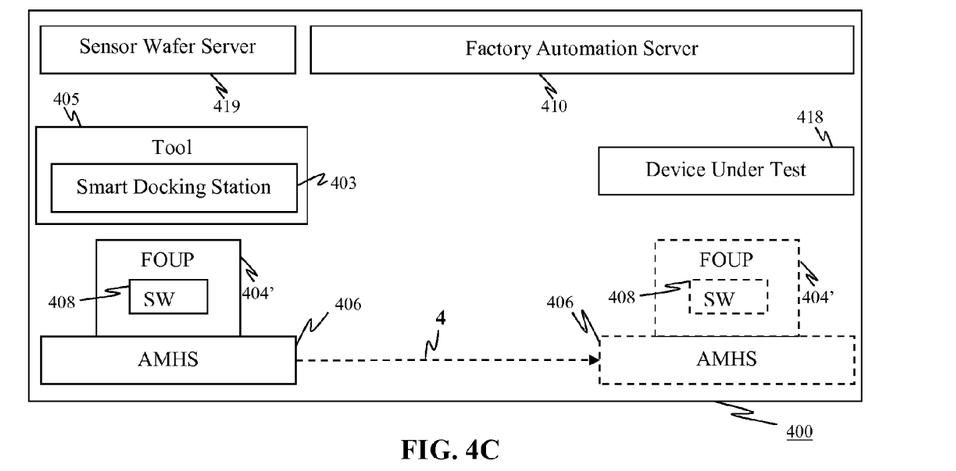

In FIG. 4B, the sensor wafer 408 is extracted from the smart docking station 403 by the tool 405 and inserted into a FOUP 404' so it may be transported by the AMHS 406. By way of example, and not by way of limitation, the tool 405 may extract the sensor wafer 408 in a manner similar to how a wafer would be handled under normal processing conditions. This may include using a wafer transporting robot, such as a SCARA, or by extracting the sensor wafer 408 from the smart docking station 403 and inserting it into the FOUP 404' manually. The electrical connection 211 and the data connection 212 between the smart docking station 403 and the sensor wafer 408 are each disconnected when the sensor wafer 408 is extracted from the smart docking station 403.

Once the recipe and the mission have been delivered, the FA server 410 may send instructions over the network to the AMHS 406 instructing it to retrieve the sensor wafer 408 and deliver it to the DUT 418 as indicated by arrow 2 in FIG. 4B. The AMHS 406 may travel to the tool 405 from an arbitrary location as indicted by the dashed arrow 3 The instructions sent to the AMHS 306 may also include a priority level for the analysis. By way of example, if the analysis needs to be done immediately, a high priority level may be assigned to the task, or if the analysis is not critical, a low priority may be assigned to the task. Next, in FIG. 4C, the AMHS 406 retrieves the FOUP 404' housing the sensor wafer 408 and delivers it to the DUT 418 as indicated by arrow 4.

Figure 4D:
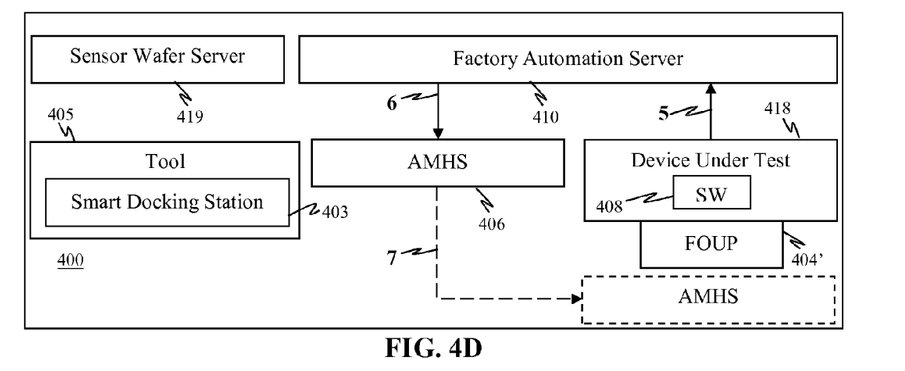

FIG. 4D depicts the process once the FOUP 404' has been delivered to the DUT 418. The DUT 418 may extract the sensor wafer 408 from the FOUP 404 and begin executing the recipe. By way of example, and not by way of limitation, the DUT 418 may extract the sensor wafer 408 in a manner similar to how a wafer would be handled under normal processing conditions. This may include using a wafer transporting robot, such as a SCARA, or by manually extracting the sensor wafer from the FOUP 404'.

Figure 4E:
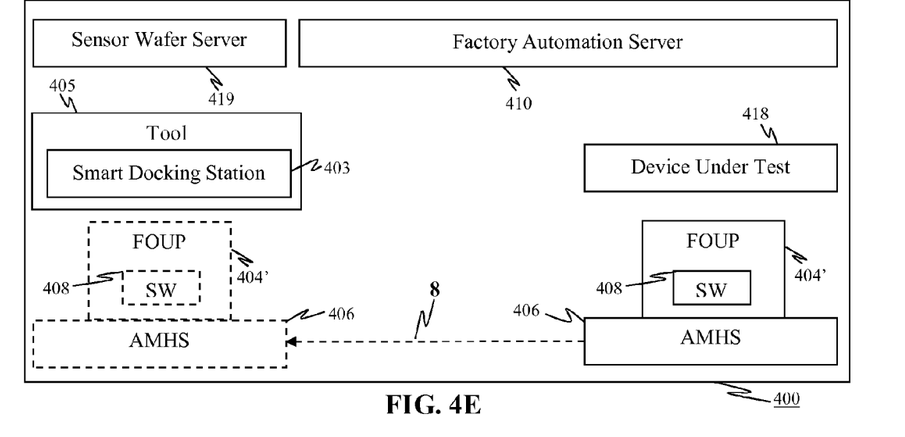

Once the recipe has been completed, the DUT 418 may deliver the sensor wafer back to the FOUP 404. The DUT 418 may also deliver a message to the FA server 410 over the network 160 indicating that the analysis has been competed as indicated by arrow 5. The FA server 410 may then send an instruction over the network 160 instructing the AMHS 406 to retrieve the FOUP 404' and deliver it back to a tool 405 with a smart docking station 403, as indicated by arrow 6. The AMHS 406 may travel from an arbitrary location to the DUT 418 as indicated by the dashed arrow 7. It should be noted that the FOUP 404' does not need to be delivered back to the same tool 405 that it originated from. By way of example, and not by way of limitation, the FOUP 404' may be delivered to the nearest tool 405 with an available smart docking station 403 or a tool 405 with a smart docking station 403 that is proximate to a second DUT 418 where the next analysis may be performed. FIG. 4E depicts the AMHS 406 retrieving the FOUP 404' and delivering it to a tool 405 with a smart docking station 403 as indicated by arrow 8.

Figure 4F:
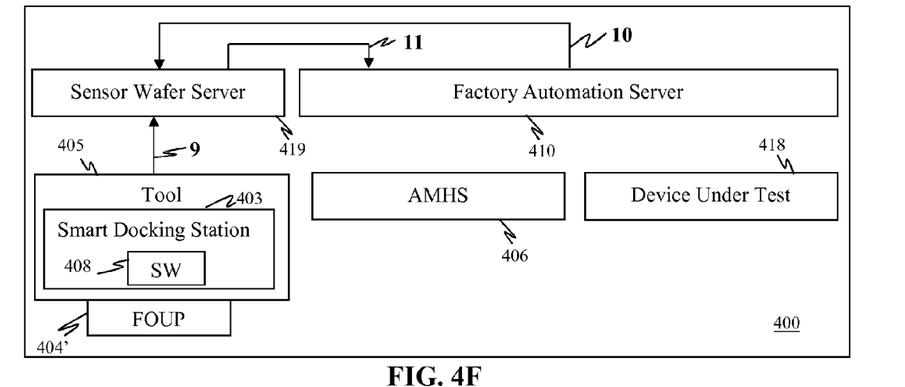

FIG. 4F depicts the process once the FOUP 404' has been delivered to a tool 405 housing the smart docking station 403. The tool 405 may extract the sensor wafer 408 from the FOUP 404. By way of example, and not by way of limitation, the tool 205 may extract the sensor wafer 408 in a manner similar to how a wafer would be handled under normal processing conditions. This may include using a wafer transporting robot, such as a SCARA, or by manually extracting the sensor wafer from the FOUP 404'.

After the sensor wafer 408 is docked at the smart docking station 403 and the data connection 212 has been reestablished, the data that has been logged by the sensor wafer 408 may be downloaded by the smart docking station 403. Additionally, after the electrical connection 211 has been reestablished, the smart docking station 403 may begin providing a charge to the battery 214 in the sensor wafer 408 so that the sensor wafer 408 is ready for its next mission. As indicated by arrow 9, the smart docking station may then upload the logged data from the sensor wafer 408 to the sensor wafer server 419 over the network 160. The sensor wafer server 419 may save the raw data and may also process the data into a desired format.

In an optional process, the FA server 410 may send a request for the data to the sensor wafer server 419 over the network 160 as indicated by arrow 10. The sensor wafer server 419 may then optionally deliver the requested data to the FA server 410 as indicated by arrow 11. The sensor wafer server 419 may deliver the processed data, the raw data, or both to the FA server 410. According to some aspects of the present disclosure, the FA server 410 and the sensor wafer server 419 may be implemented on the same hardware, but remain logically separate. Alternatively, the FA server 410, and the sensor wafer server 419 may be implemented on separate hardware. It is further noted that there is no requirement that the FA server 410 and sensor wafer server 419 to exchange data directly.

It is noted that, for the purposes of example, the tool 405 having the smart docking station 403 and the device under test 418 are shown as being different devices, e.g., different tools. However, it is within the scope of aspects of the present disclosure for both tool 405 and the DUT 418 to be the same device, e.g., the smart docking station may be a component of the DUT 418. In such cases, transfer of the sensor wafer 408 to the docking station may be implemented without having to transfer the FOUP 404' from the DUT 418 back to the tool 405 and the docking station at the DUT 418 (not shown) may upload data from the sensor wafer 408 to the sensor wafer server 419 or FA server 410.

It is further noted that in the examples shown in FIGS. 3A-3F and FIGS. 4A-4F the sensor wafer server and the factory automation server are shown as being different servers. This is not a strict requirement, although it is sometimes convenient in practical implementations. Alternatively, the functions of the sensor wafer server and factory automation server may be implemented by the same hardware, e.g., a common server. For example, functions of the sensor wafer data server 419 may be implemented by the factory automation server 410. In such a case, the factory automation server 410 may communicate directly with the sensor wafer 408 via the smart docking station 403.

The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC §112, ¶6. In particular, the use of "step of" in the claims herein is not intended to invoke the provisions of 35 USC §112, ¶6.

What is claimed is:

1. In a docking station configured to operate on a network, a method for characterizing a process in a tool, comprising:
   a) receiving a sensor wafer from a robotic wafer delivery system at a docking station located at an off-track storage location that is above floor level and separate from the tool and adjacent to a pathway used by an automated material handling system (AMHS) and accessible by the AMHS, wherein a memory in the sensor wafer has one or more sets of data from a tool process characterization mission;
   b) establishing a data connection between the docking station and the sensor wafer;
   c) downloading the one or more sets of data from the memory in the sensor wafer; and
   d) delivering the downloaded data over the network to a server, wherein the docking station is a separate unit from a wafer carrier that houses the sensor wafer during transportation, via the AMHS, of the sensor wafer from the docking station to a tool or from a tool to the docking station.

2. The method of claim 1, wherein the docking station is located within a tool.

3. The method of claim 2, wherein the robotic wafer delivery system is comprised of the AMHS and a wafer transporting robot.

4. The method of claim 1, wherein the off-track storage location is above the tool.

5. The method of claim 4, wherein the AMHS includes an overhead track (OHT) system.

6. The method of claim 1, wherein the wafer carrier is a front opening unified pod (FOUP), wherein the sensor wafer is housed inside of the FOUP during said transportation of the sensor wafer from the docking station to a tool or from a tool to the docking station, and wherein the FOUP can transfer data to and/or from the memory in the sensor wafer over a data contact.

7. The method of claim 6, wherein the FOUP is configured to transfer data wirelessly to or from the server without having to use a docking station to provide a conduit for the data.

8. The method of claim 1, further comprising establishing an electrical connection between the docking station and the sensor wafer, wherein the electrical connection is configured to provide a charge to a battery in the sensor wafer.

9. The method of claim 8, wherein the electrical connection and the data connection are the same connection.

10. The method of claim 8, wherein the electrical connection and the data connection are made with a single USB connection.

11. The method of claim 1, further comprising, receiving a mission over the network from a factory automation server and delivering the mission to the sensor wafer, wherein the mission instructs the sensor wafer to collect one or more sets of data during a process characterization operation in a tool.

12. The method of claim 10, further comprising delivering the sensor wafer to the robotic wafer delivery system.

13. The method of claim 1, wherein the server is a sensor wafer server.

14. The method of claim 1, wherein the server is a factory automation server.

15. A non-transitory computer readable medium containing program instructions for characterizing a process in a tool, and wherein execution of the program instructions by one or more processors of a computer system causes the one or more processors to carry out the steps of:
  a) receiving a sensor wafer from a robotic wafer delivery system at a docking station located at an off-track storage location that is above floor level and separate from the tool and adjacent to a pathway used by an automated material handling system (AMHS) and accessible by the AMHS, wherein a memory in the sensor wafer has one or more sets of data from a tool process characterization mission;
  b) establishing a data connection between the docking station and the sensor wafer;
  c) downloading the one or more sets of data from the memory in the sensor wafer; and
  d) delivering the downloaded data over the network to a server, wherein the docking station is a separate unit from a wafer carrier that houses the sensor wafer during transportation, via the AMHS, of the sensor wafer from the docking station to a tool or from a tool to the docking station.

16. A docking station for a sensor wafer, configured to operate on a network, comprising:
  a processor;
  a memory coupled to the processor; and
  one or more instructions embodied in memory for execution by the processor, the instructions being configured to characterize a process in a tool, the method comprising:
  a) receiving a sensor wafer from a robotic wafer delivery system at a docking station located at an off-track storage location that is above floor level and separate from the tool and adjacent to a pathway used by an automated material handling system (AMHS) and accessible by the AMHS, wherein a memory in the sensor wafer has one or more sets of data from a tool process characterization mission;
  b) establishing a data connection between the docking station and the sensor wafer;
  c) downloading the one or more sets of data from the memory in the sensor wafer; and
  d) delivering the downloaded data over the network to a server, wherein the docking station is a separate unit from the wafer carrier that houses the sensor wafer during transportation, via the AMHS, of the sensor wafer from the docking station to a tool or from a tool to the docking station.

17. A docking station configured to operate over a network comprising:
  a support structure configured to support a sensor wafer, wherein the support structure is further configured to receive the sensor wafer from a robotic wafer delivery system; and
  a docking interface configured to interface with the sensor wafer, wherein the docking interface comprises a data connection configured to download one or more sets of data from a tool process characterization mission stored in a memory in the sensor wafer to the docking station, and wherein the docking station is further configured to deliver the one or more sets of data downloaded from the sensor wafer to a server over the network, wherein the docking station is located at an off-track storage location that is above floor level and separate from the tool and adjacent to a pathway used by an automated material handling system (AMHS) and accessible by the AMHS, wherein the docking station is a separate unit from a wafer carrier that houses the sensor wafer during transportation, via the AMHS, of the sensor wafer from the docking station to a tool or from a tool to the docking station.

18. The docking station of claim 17, wherein the off-track storage location is above the tool.

19. The docking station of claim 17, wherein the docking interface further comprises an electrical connection configured to charge a battery in the sensor wafer.

20. The docking station of claim 19, wherein the electrical connection and the data connection are the same connection.

21. The docking station of claim 19, wherein the electrical connection and the data connection are made with a single USB connection.

22. The docking station of claim 17, wherein the wafer carrier is a front opening unified pod (FOUP) and the sensor wafer is housed inside of the FOUP during said transportation of the sensor wafer from the docking station to a tool or from a tool to the docking station.

23. The docking station of claim 17, wherein the AMHS includes an overhead track (OHT) system.

24. The docking station of claim 17, wherein the docking interface further comprises an electrical connection configured to charge a battery in the sensor wafer.

25. The docking station of claim 24, wherein the electrical connection and the data connection are the same connection.

26. The docking station of claim 25, wherein the electrical connection and the data connection are made with a single USB connection.

27. The docking station of claim 17, wherein the robotic wafer delivery system comprises the AMHS and a wafer transporting robot.

28. The docking station of claim 17, wherein the server is a sensor wafer server.

29. The docking station of claim 17, wherein the server is a factory automation server.

30. The docking station of claim 17, wherein the docking station is further configured to receive a mission over the network from a factory automation server and deliver the mission to the sensor wafer, wherein the mission instructs the sensor wafer to collect one or more sets of data during a process characterization operation in a tool.

31. The docking station of claim 30, wherein the support structure is further configured to deliver the sensor wafer to the robotic wafer delivery system.

\* \* \* \* \*